United States Patent
Reinheimer

(10) Patent No.: US 8,217,093 B2
(45) Date of Patent: *Jul. 10, 2012

(54) TWO-COMPONENT POLYURETHANE / VINYL ESTER HYBRID FOAM SYSTEM AND ITS USE AS A FLAME RETARDANT MATERIAL AND MATERIAL FOR FILLING OPENINGS IN BUILDINGS WITH FOAM

(75) Inventor: Arne Reinheimer, Irsee (DE)

(73) Assignee: Hilti Aktiengesellschaft, Schaan (LI)

( * ) Notice: Subject to any disclaimer, the term of this patent is extended or adjusted under 35 U.S.C. 154(b) by 898 days.

This patent is subject to a terminal disclaimer.

(21) Appl. No.: 11/998,392

(22) Filed: Nov. 28, 2007

(65) Prior Publication Data

US 2008/0132593 A1 Jun. 5, 2008

(30) Foreign Application Priority Data

Nov. 29, 2006 (DE) .......................... 10 2006 056 401

(51) Int. Cl.
*C08G 18/28* (2006.01)
(52) U.S. Cl. ........ 521/130; 521/137; 521/138; 521/139; 521/159; 521/170; 521/172; 521/173; 521/176
(58) Field of Classification Search .................. 521/130, 521/137, 138, 139, 159, 170, 172, 173, 176
See application file for complete search history.

(56) References Cited

U.S. PATENT DOCUMENTS

| 6,451,430 | B1 * | 9/2002 | Smith ......................... 428/423.7 |
| 6,699,916 | B2 * | 3/2004 | Lekovic et al. ............... 521/130 |
| 2003/0087974 | A1 * | 5/2003 | Lekovic et al. ................ 521/99 |

FOREIGN PATENT DOCUMENTS

WO 2006/041559 * 4/2006

* cited by examiner

*Primary Examiner* — John Cooney
(74) *Attorney, Agent, or Firm* — Abelman, Frayne & Schwab

(57) ABSTRACT

A two-component polyurethane/vinyl ester hybrid foam system is formed of a polyol component (A), which contains at least one polyol, a catalyst for the reaction of the polyol with the polyisocyanate, at least one polymerizable vinyl monomer and water or a blowing agent on the basis of a compressed or liquefied gas as foam-forming agent, and a polyisocyanate component (B), which contains at least one polyisocyanate and a catalyst for the polymerization of the vinyl monomer, and is designed for use as a flame retardant material and material for filling openings, cable and pipe bushings in walls, floors and/or of buildings for the purpose of fire protection.

32 Claims, No Drawings

TWO-COMPONENT POLYURETHANE / VINYL ESTER HYBRID FOAM SYSTEM AND ITS USE AS A FLAME RETARDANT MATERIAL AND MATERIAL FOR FILLING OPENINGS IN BUILDINGS WITH FOAM

BACKGROUND OF THE INVENTION

1. Field of the Invention

The present invention relates to a two-component polyurethane/vinyl ester foam system with a polyol component, which contains at least one polyol, a catalyst for the reaction of the polyol with the polyisocyanate, at least one polymerizable vinyl monomer and water or a blowing agent on the basis of a compressed or liquefied gas as foam-forming agent, and a polyisocyanate component, which contains at least one polyisocyanate and a catalyst for the polymerization of the vinyl monomer. The present invention also relates to a method of using this hybrid foam system as a flame retardant material and material for filling openings, cable and pipe bushings in walls, floors and/or ceilings of buildings for the purpose of fire protection.

2. Description of the Prior Art

The use of polyurethane foam systems for forming the polymer matrix of polyurethane foams and fire protection products is well known. For example, it is customary to install, for example, doors and windows of buildings with the help of such a polyurethane foam in the appropriate openings of the building and to foam cable and pipe bushings in walls, floors and/or ceilings of buildings for the purpose of fire protection using such a polyurethane foam system, in order to prevent or delay flames penetrating through these openings in the case of a fire.

It is an essential task of the polymer matrix of such products, especially in the case of a fire-protection product, to act as a binder for the actual fire-retardant additives, such as an intumescing material based on an acid-forming agent, a carbon-supplying compound and a gas-forming agent, as well as expanding graphite or expandable phyllosilicates. The intumescing materials expand in the event of a fire, increase the volume of the foam and make the latter more fire resistant.

As a rule, the polyurethane foam systems, used for such purposes, comprise a polyol component and a polyisocyanate component, which, in the presence of a blowing agent such as water, react with one another with the formation of polyurethane foam. These polyurethane foams may be rigid or soft and these properties, as is well known to those of ordinary skill in the art, can readily be adjusted by appropriately modifying the formulation. In this connection, reference is made to D. Klempner et al., Polymeric Foams, Hanser Publishers, Munich (1991).

Adapting such polyurethane foam systems in the course of developing a foam formulation is, however, always costly if, for example, the formulation is to be converted from a rigid foam to a soft foam or vice versa, since the shrinkage behavior of soft foams is far more pronounced and is to be prevented.

Accordingly, an object of the present invention is to make available such polyurethane foam systems, which would differ only marginally from the formulation of a more rigid and a softer foam, so that the desired foam properties can be adjusted by a minor modification of the formulation depending on the customer's wishes or on the requirements of the application.

SUMMARY OF THE INVENTION

Applicant has found out that the hardness of a hybrid foam system based on polyurethane and vinyl ester components can be adjusted selectively by the addition of multivalent metals, if the formulation contains at least one polymerizable vinyl monomer, which forms a chelate complex with the multivalent metal. For adjusting the hardness, it is then merely necessary to modify the content of multivalent metal in the formulation, the remaining components of the formulation being unchanged.

Accordingly, these and other objects of the present invention, which will become apparent hereinafter are achieved by providing a two-component polyurethane/vinyl ester hybrid foam system with a polyol component, which contains at least one polyol, a catalyst for the reaction of the polyol with the polyisocyanate, at least one polymerizable vinyl monomer, water or a blowing agent on the basis of a compressed or liquefied gas as foam-forming agent, and a polyisocyanate component, which contains at least one polyisocyanate and a catalyst for the polymerization of the vinyl monomer and is characterized in that the polyol component contains at least one compound of a multivalent metal and at least one polymerizable vinyl monomer, forming a chelate complex with the multivalent metal.

Preferably, the hybrid foam system contains at least one polymerizable vinyl monomer, forming an at least tridentate chelate complex, such as, preferably, (2-acetoacetoxy)-ethyl acrylate.

Advantageously, the polymerizable vinyl monomer, forming a chelate complex with the multivalent metal, is contained in an amount of 0.1 to 50% by weight and preferably of 0.5 to 40% by weight, based on the total weight of the components and the multivalent metal is contained in an equimolar amount for forming the chelate complex.

As multivalent metal, the inventive hybrid foam system preferably contains a trivalent metal, which can coordinate six-fold. In accordance with a further preferred embodiment of the invention, the hybrid foam system contains trivalent iron (Fe(III)), trivalent aluminum (Al(III)), trivalent chromium (Cr(III)), trivalent cobalt (Co(III)) and/or trivalent ruthenium (Ru(III)) as multivalent metal.

Preferably, the trivalent metal is added to the hybrid foam system in the form of $FeCl_3$, $AlCl_3$, $CrCl_3$, Co(III)-acetylacetonate and/or $RuCl_3$.

In the event that trivalent iron is used in the form of, for example, $FeCl_3$, which is preferred pursuant to the invention, the chelate complex of the formula below, together with the preferred polymerizable monomer (2-acetoacetoxy)-ethyl methacrylate, is formed in the hybrid foam system:

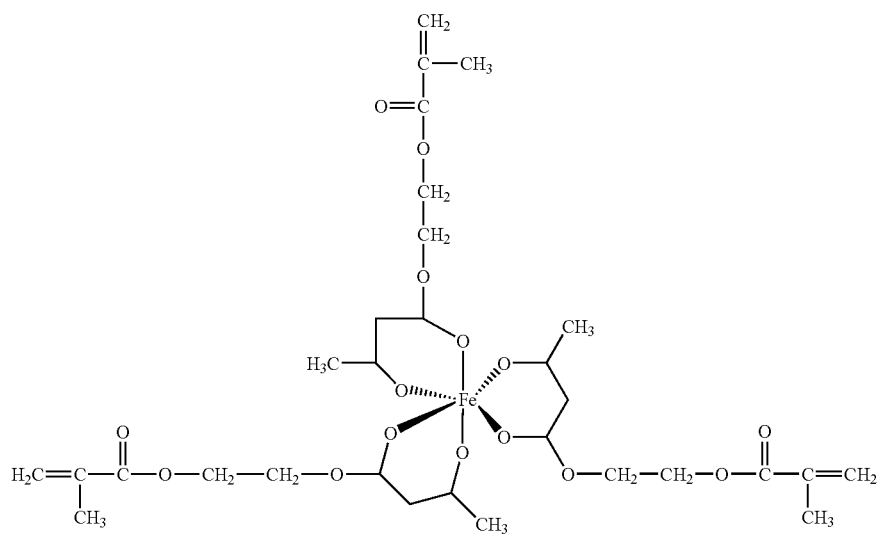

When used as intended, that is, after the polyol component is mixed with the polyisocyanate component and the thereupon following formation of the polyurethane foam and the polymerization of the vinyl monomer, the chelate complex, formed from the multivalent metal and the polymerizable vinyl monomer, for example, of the above formula, is polymerized into the polymeric network of the hybrid foam. This leads to an increase in the cross-linking density and, with that, to an increase in the rigidity of the hybrid foam. Pursuant to the invention, due to the use of the multivalent metal and the polymerizable vinyl monomer forming a chelate complex, a complex is formed, which, because of its cross-linking points during the free radical polymerization, forms a three-dimensional polymer network, that is, a rigid foam. Pursuant to the invention, it thus becomes possible to adjust the hardness of the hybrid foam formed selectively by a simple modification of the amount of multivalent metal added, without having to modify the other components of the hybrid foam system.

DETAILED DESCRIPTION OF THE PREFERRED EMBODIMENT

In accordance with a preferred embodiment, the inventive hybrid foam system contains a polymerizable vinyl monomer, forming a chelate complex, and, as a further polymerizable vinyl monomer, a vinyl ester, which is selected from the group comprising the alkyl (meth)acrylates, aryl (meth)acrylates, hydroxyalkyl (meth)acrylates, (meth)acrylamides, ether (meth)acrylates, multifunctional cross-linked (meth)acrylates, vinyl ester urethane resins, alkoxylated bisphenol A dimethacrylates, alkoxylated bisphenol F dimethacrylates, (meth)acrylic acid, (meth)acrylic anhydride and (meth)acrylonitrile.

The following vinyl esters are particularly preferred: methyl (meth)acrylate, ethyl (meth)acrylate, n-butyl (meth)acrylate, isobutyl (meth)acrylate, n-hexyl (meth)acrylate, 2-ethylhexyl (meth)acrylate, isodecyl (meth)acrylate, (meth)acrylate ester 13,0, (meth)acrylate ester 17,4, cyclohexyl (meth)acrylate, isobornyl (meth)acrylate, benzyl (meth)acrylate, 3,3,5-trimethylcyclohexyl (meth)acrylate, isotridecyl (meth)acrylate, stearyl (meth)acrylate, 2-hydroxyethyl (meth)acrylate, hydroxypropyl (meth)acrylate, 2-dimethylaminoethyl methacrylate, 3-dimethylaminopropyl (meth)acrylamide, 2-trimethylammoniumethyl (meth)acrylic chloride, 3-trimethylammonium-propyl (meth)acrylamide chloride, 2-t-butylaminoethyl (meth)acrylate, (meth)acrylamide, N-methylol (meth)acrylamide, N-butoxymethyl (meth)-acrylamide, ethyltriglycol (meth)acrylate, tetrahydrofurfuryl (meth)acrylate, methoxy(polyethylene glycol 350) (meth)acrylate, methoxy(polyethylene glycol 500) (meth)acrylate, methoxy(polyethylene glycol 750) (meth)acrylate, methoxy(polyethylene glycol 1000) (meth)acrylate, (meth)acrylate esters of ethoxylated (25 mol EO) $C_{16}$-$C_{18}$ fatty alcohol mixtures, butyl diglycol (meth)acrylate, allyl (meth)acrylate, ethylene glycol di(meth)acrylate, diethylene glycol di(meth)acrylate, triethylene glycol di(meth)acrylate, tetraethylene glycol di(meth)acrylate, polyethylene glycol 200 di(meth)-acrylate, polyethylene glycol 400 di(meth)acrylate, polyethylene glycol 600di(meth)acrylate, polyethylene glycol 1000 di(meth)acrylate, 1,3-butane diol di(meth)acrylate, 1,4-butane diol di(meth)acrylate, 1,6-hexane diol di(meth)-acrylate, 1,12-dodecane diol di(meth)acrylate, glycerin di(meth)acrylate, trimethylolpropane tri(meth)acrylate, diurethane di-(meth)acrylate, reaction products of polyfunktional isocyanate, optionally multihydric alcohol and/or polyamines and a hydroxylalkyl (meth)acrylate, ethoxylated (2 EO) bisphenol A di(meth)acrylate, ethoxylated (10 EO) bisphenol A di(meth)acrylate, (meth)acrylic acid, (meth)acrylic anhydride, mono-2-(meth)acryloyloxyethyl maleate, N-(2-(meth)acryloyloxyethyl)ethylene urea, N-(2-(meth)acryloyloxyethyl)ethylene urea, ethylene cyanhydrin and acetone cyanhydrin and mixtures thereof.

The chemical nomenclature, employed for the vinyl esters above, " . . . (meth)acrylate", implies that the methacrylate compound in question as well as the acrylate compound is to be included. The expression methyl methacrylate therefore represents methyl methacrylate and methyl acrylate. The corresponding also applies to (meth)acrylic acid derivatives and (meth)acrylamides.

Pursuant to the invention, it is advantageous if the polyol component (A) contains 5 to 60% by weight and preferably 10 to 50% by weight of at least one polyol, 0.01 to 5% by weight and preferably 0.1 to 4% by weight of water as blowing agent, 0.1 to 50% by weight and preferably 0.5 to 40% by weight of at least one polymerizable vinyl monomer, 0.1 to 50% by weight and preferably 0.5 to 40% by weight of at least one chelate complex-forming, polymerizable vinyl monomer, 0.01 to 10% by weight and preferably 0.1 to 5.0% by weight of at least one multivalent metal in the form of the chloride or acetylacetonate in the case of chromium, 0.01 to 10% by weight and preferably 0.1 to 5.0% by weight of at least one cell stabilizer and 0 to 10% by weight and preferably 0.1 to 5% by weight of at least one catalyst for the reaction of the polyol with the polyisocyanate and the polyisocyanate component (B) contains 1 to 50% by weight and preferably 10 to 40% by weight of at least one polyisocyanate and 0.01 to 10% by weight and preferably 0.1 to 5% by weight of at least one catalyst for the polymerization of the vinyl monomers, based in each case on the total weight of the components (A) and (B), the total amount of these components constituting 100% by weight.

As catalyst for the reaction of the polyol with the polyisocyanate, the polyol component (A) of the inventive hybrid foam system contains a catalyst, commonly used for this purpose, such as an aromatic and/or aliphatic, secondary or tertiary amine, an organometallic compound of a metal from the group comprising Zn, Sn, Mn, Mg, Bi, Sb, Pb and Ca, especially an octoate, naphthenate or acetylacetonate of these metals.

In accordance with an advantageous embodiment of the invention, the polyisocyanate component (B) contains as catalyst for the polymerization of the vinyl monomers at least one free radical-forming agent, which can be activated thermally, preferably a peroxide curing agent, optionally made inert with chalk, kaolin, silicone oil, aliphatic materials and/or white oil.

As peroxide curing agent for the inventive hybrid foam system, di-4-t-butylcyclohexyl peroxydicarbonate, dicetyl peroxydicarbonate, dicyclohexyl peroxydicarbonate, dimyristyl peroxydicarbonate, t-butyl peroxyneodecanoate, t-amylperoxy pivalate, dilauroyl peroxide, dibenzoyl peroxide, t-amyl peroxy-2-ethylhexanoate, t-butyl peroxy-2-ethylhexanoate, disuccinoyl peroxide, t-amyl peroxy-2-ethylhexylcarbonate, 1,1-di-(t-butylperoxy)-3,3,5-trimethylcyclohexane, 1,1-di-(t-butylperoxy)cyclohexane, t-butyl peroxyisopropylcarbonate, t-butyl peroxy-3,5,5-trimethylhexanoate, t-butyl peroxy-2-ethylhexylcarbonate, t-butyl peroxyacetate, t-amyl peroxybenzoate, t-butyl peroxybenzoate, 2,2-di-(t-butyl peroxy)-butane, dicumyl peroxide, t-butyl cumylperoxide, di-(t-amyl) peroxide, di-(t-butyl) peroxide, t-butyl hydroperoxide, ammonium peroxodisulfate, sodium peroxodisulfate and potassium peroxodisulfate or mixtures thereof are particularly suitable, especially dibenzoyl peroxide made inert with phthalate, that is, phthalate ester.

If the inventive hybrid foam system is to be used for fire protection, the polyol component (A) and/or the polyisocyanate component (B) preferably contain an intumescing material based on an acid forming agent, a carbon-supplying compound and a gas-forming agent, expanding graphite, an expandable phyllosilicate and/or an additional organic or inorganic flame retardant.

As flame retardant, red phosphorus, a phosphorus compound, especially a halogenated phosphate ester, such as trichloroethyl phosphate, tris(2-chloroisopropyl) phosphate, triphenyl phosphate or tris(2-chloroethyl) phosphate, a metal hydroxide, especially aluminum hydroxide or magnesium hydroxide, zinc borate and ammonium polyphosphate, as well as, optionally, antimony oxide are especially preferred as synergists.

Moreover, the polyol component (A) as well as the polyisocyanate component (B) may contain additionally at least one inorganic filler, preferably a metal oxide, a borate, a carbonate, preferably chalk, a silicate, kaolin, glass powder, iron oxide, titanium dioxide, silica, an inorganic foam, preferably foamed, expanded clay, perlite and vermiculite, and/or hollow silica or glass spheres.

For adjusting the desired properties, known adjuvants and additives, stabilizers, plasticizers, catalysts, thixotropic agents, diluents or solvents and/or pigments or dyes in the usual amount may additionally be added to the polyol component (A) and/or the polyisocyanate component (B). As thixotropic agents, preferably hydrophobic or hydrophobized silica is used and, as diluent or solvent, aliphatic alcohols such as butanol are preferred.

In accordance with a preferred embodiment of the inventive two-component polyurethane/vinyl ester hybrid foam system, the polyol component (A) and the polyisocyanate component (B) are kept separated from one another in a two-chamber or multichamber device to inhibit any reaction and caused to react under use conditions. Moreover, the polyol component (A) and the polyisocyanate component (B) preferably are contained in such amounts, that, when used as intended, the ratio of NCO to OH is greater than 1:1.

Because the hardness of the hybrid foam can easily be adjusted selectively pursuant to the invention, the inventive, two-component polyurethane/vinyl ester hybrid foam system is particularly suitable for use as a flame retardant and as a material for filling openings, cable and pipe bushings in walls, floors and/or ceilings of buildings with foam for the purpose of fire protection, as well as a construction foam and as a polyurethane foam especially at building sites for fitting and fixing windows, doors, façade elements and the like.

The following examples are to explain the invention further.

Example 1

Of the Invention

Forming a hybrid foam system using trivalent iron as multivalent metal.

Polyol Component (A)
(1) Polyol: 29.3% by weight of polyethylene glycol (Pluriol E 600)
(2) Blowing agent: 0.6% by weight of water
(3) Cell stabilizer: 1.0% of a silicone copolymer (DABCO DC 193)
(4) Catalyst for the reaction of the polyol with the polyisocyanate: 0.6% by weight of a mixture of 70% bis(2-dimethylamino ethyl)ether and 30% dipropylene glycol (Jeffcat ZF-22)
(5) Vinyl ester: 2.9% by weight of hydroxypropyl methacrylate
(6) Vinyl ester: 7.3% by weight of 1,4-butane diol dimethacrylate
(7) Vinyl ester: 7.3% ethoxylated (2 EO) bisphenol A dimethacrylate (SR 348L)
(8) Vinyl ester: 22.7% by weight of trimethylolpropane trimethacrylate
(9) Chelate complex-forming vinyl monomer: 1.0% by weight (2-aceto-acetoxy)-ethyl methacrylate Polyisocyanate Component (B):
(10) Multivalent metal: 0.01% by weight of iron(III) chloride
(11) Polyisocyanate: 26.3% by weight of a pre-polymer based on 4,4'-methylenebis phenyl isocyanate ((Voranate M 220)

(12) Thermally activatable free radical-forming agent: 1.0% by weight of dibenzoyl peroxide, inertized with phthalate (BP-50-FT)

Example 2

Comparison Example

Formation of a hybrid foam system without a multivalent metal

A polyol component (A) and a polyisocyanate component (B), based on the following components, are prepared:

Polyol Component (A):
(1) Polyol: 29.3% by weight of polyethylene glycol (Pluriol E 600)
(2) Blowing agent: 0.6% by weight of water
(3) Cell stabilizer: 1.0% by weight of a silicone copolymer (DABCO DC 193)
(4) Catalyst for the reaction of the polyol with the polyisocyanate: 0.6% by weight of a mixture of 70% bis(2-dimethylaminoethyl)ether and 30% of dipropylene glycol (JeffcatZF-22)
(5) Vinyl ester: 2.9% by weight of hydroxypropyl methacrylate
(6) Vinyl ester: 7.3% by weight of 1,4-butane diol dimethacrylate
(7) Vinyl ester: 7.3% by weight of ethoxylated (2 EO) bisphenol A di-methacrylate (SR 348L)
(8) Vinyl ester: 22.7% by weight of trimethylolpropane trimethacrylate
(9) Chelate complex-forming vinyl monomer: 1.0% by weight of (2-aceto-acetoxy)-ethyl methacrylate Polyisocyanate Component (B):
(10) Polyisocyanate: 26.3% by weight of a prepolymer based on 4,4-methylenebis(phenyl isocyanate) Voranate M 220)
(11) Thermally activatable free radical-forming agent: 1.0% by weight of dibenzoyl peroxide, inertized with phthalate (BP-50-FT)

In each case, the components (1) to (9) are mixed to form the polyol component (A) and the components (10) to (12) are mixed to form the polyisocyanate component (B) and are brought into a two-chamber device in order to inhibit any reaction. For the intended use, the polyol component is mixed with the polyurethane component and an exothermic reaction, in which polyurethane is formed and foam is developed, takes place. Upon reaching the activation temperature of the thermally activatable free radical-forming agent, the free radical polymerization of the vinyl monomers then takes place with formation of a hybrid foam system without the use of the multivalent metal.

The polyol component (A) and the polyisocyanate component (B) are prepared as described in Example 1, the given components (1) to (11) being used.

The hybrid foam system is foamed and cured as described in Example 1 by mixing the polyol component (A) with the polyisocyanate component (B).

The pressure resistance of the hybrid foams, obtained in Examples 1 and 2 in the presence and absence of iron(III) chloride was determined with the help of a material testing machine (Zwick/Roell Z050). For this purpose, cylindrical test pieces with a diameter of 27 mm and a height of 33 mm were sawn with the help of a keyhole saw from the center of the hybrid foams prepared in Examples 1 and 2. The test pieces were placed in the test machine and compressed at a constant rate of advance, the ram being coupled to a load transducer. The pressure resistance of the individual test samples can be determined from the resulting force/displacement diagrams. The average from four test samples was determined for ascertaining the pressure resistance.

In this connection, it was observed that the pressure resistance of the hybrid foam, formed with the inventive hybrid foam system, is $0.138 \pm 0.012$ N/mm$^2$. On the other hand, the pressure resistance of the comparison hybrid foam, prepare according to example 2 without the use of iron(III) chloride, was only $0.043 \pm 0.003$ N/mm$^2$.

With that, it becomes evident that it is possible, pursuant to the invention, to increase the hardness of the hybrid foam by a factor of 3 by using iron(III) chloride in a very small amount.

According to the teachings of the present invention, it is unexpectedly possible to adjust the hardness of the hybrid foam, produced with the claimed hybrid foam system, selectively to the desired value, merely by the addition of a multivalent metal, the degree of hardness being controlled as a function of the amount of multivalent metal added.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A two-component polyurethane/vinyl ester hybrid foam system with a polyol component (A), which contains at least one polyol, a catalyst for the reaction of the polyol with the polyisocyanate, at least one polymerizable vinyl monomer and water or a blowing agent on the basis of a compressed or liquefied gas as foam-forming agent, and a polyisocyanate component (B), which contains at least one polyisocyanate and a catalyst for the polymerization of the vinyl monomer, characterized in that the polyol component (A) contains at least one compound of a multivalent metal and at least one polymerizable vinyl monomer, which forms a chelate complex with the multivalent metal.

2. The two-component polyurethane/vinyl ester hybrid foam system of claim 1 further comprising at least one polymerizable vinyl monomer, which forms an at least tridentate chelate complex with the multivalent metal.

3. The two-component polyurethane/vinyl ester hybrid foam system of claim 1, wherein it contains the polymerizable vinyl monomer, forming a chelate complex with the multivalent metal, in an amount of 0.1 to 50% by weight, based on the total weight of the components (A) and (B), and the multivalent metal in an equimolar amount for forming a chelate complex.

4. The two-component polyurethane/vinyl ester hybrid foam system of claim 1, wherein the polymerizable monomer forming the chelate complex includes (2-acetoacetoxy)-ethyl methacrylate as.

5. The two-component polyurethane/vinyl ester hybrid foam system of claim 1, wherein the multivalent metal includes a trivalent metal which can be coordinated six fold.

6. The two-component polyurethane/vinyl ester hybrid foam system of claim 5, wherein the multivalent metal contains includes trivalent iron Fe(III), aluminum Al(III), chromium Cr(III), cobalt Co(III) and/or ruthenium Ru(III).

7. The two-component polyurethane/vinyl ester hybrid foam system of claim 6 wherein the trivalent metal is in the form of $FeCl_3$, $AlCl_3$, $CrCl_3$, Co(III) acetylacetonate and/or $RuCl_3$.

8. The two-component polyurethane/vinyl ester hybrid foam system of claim 3, wherein a chelate complex is formed having the formula

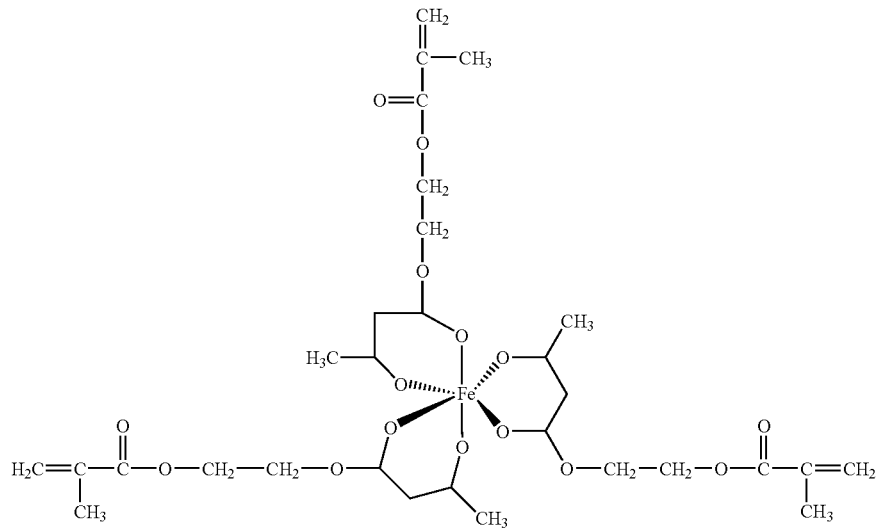

9. The two-component polyurethane/vinyl ester hybrid foam system of claim 1 comprising, as polymerizable vinyl monomer, a vinyl ester selected from the group comprising alkyl (meth)acrylates, aryl (meth)acrylates, hydroxyalkyl (meth)acrylates, (meth)acrylamides, ether (meth)acrylates, multifunctional cross-linked (meth)acrylates, vinyl ester urethane resins, alkoxylated bisphenol A dimethacrylates, alkoxylated bisphenol F dimethacrylates, (meth)acrylic acid, (meth)acrylic anhydride and (meth)acrylonitrile.

10. The two-component polyurethane/vinyl ester hybrid foam system of claim 9 comprising, as vinyl ester, at least one representative of the group comprising methyl (meth)acrylate, ethyl (meth)acrylate, n-butyl (meth)acrylate, isobutyl (meth)acrylate, n-hexyl (meth)acrylate, 2-ethylhexyl (meth) acrylate, isodecyl (meth)acrylate, (meth)acrylate ester 13,0, (meth)acrylate ester 17,4, cyclohexyl (meth)acrylate, isobornyl (meth)acrylate, benzyl (meth)acrylate, 3,3,5-trimethylcyclohexyl (meth)acrylate, isotridecyl (meth)acrylate, stearyl (meth)acrylate, 2-hydroxyethyl (meth)acrylate, hydroxypropyl (meth)acrylate, 2-dimethylaminoethyl methacrylate, 3-dimethylaminopropyl (meth)acrylamide, 2-trimethylammoniummethyl (meth)-acrylic chloride, 3-trimethylammonium-propyl (meth)acrylamide chloride, 2-t-butylaminoethyl (meth)acrylate, (meth)acrylamide, N-methylol (meth)acrylamide, N-butoxymethyl (meth)-acrylamide, ethyltriglycol (meth)-acrylate, tetrahydrofurfuryl (meth)acrylate, methoxy(polyethylene glycol 350) (meth) acrylate, methoxy(polyethylene glycol 500) (meth)acrylate, methoxy(polyethylene glycol 750) (meth)acrylate, methoxy (polyethylene glycol 1000) (meth)acrylate, (meth)acrylate esters of ethoxylated (25 mol EO) $C_{16}$-$C_{18}$ fatty alcohol mixtures, butyl diglycol (meth)acrylate, allyl (meth)acrylate, ethylene glycol di(meth)acrylate, diethylene glycol di(meth) acrylate, triethylene glycol di(meth)acrylate, tetraethylene glycol di(meth)acrylate, polyethylene glycol 200 di(meth)-acrylate, polyethylene glycol 400 di(meth)acrylate, polyethylene glycol 600 di(meth)acrylate, polyethylene glycol 1000 di(meth)acrylate, 1,3-butane diol di(meth)acrylate, 1,4-butane diol di(meth)acrylate, 1,6-hexane diol di(meth)acrylate, 1,12-dodecane diol di(meth)acrylate, glycerin di(meth)acrylate, trimethylolpropane tri(meth)acrylate, diurethane di-(meth)acrylate, reaction products of polyfunktional isocyanate, optionally multihydric alcohol and/or polyamines and a hydroxylalkyl (meth)acrylate, ethoxylated (2 EO) bisphenol A di(meth)acrylate, ethoxylated (10 EO) bisphenol A di(meth)acrylate, (meth)acrylic acid, (meth)acrylic anhydride, mono-2-(meth)acryloyloxyethyl maleate, N-(2-(meth) acryloyloxyethyl) ethylene urea, N-(2-(meth)acryloyloxyethyl) ethylene urea, ethylene cyanhydrin and acetone cyanhydrin.

11. The two-component polyurethane/vinyl ester hybrid foam system of claim 1, wherein the polyol component (A) contains 5 to 60% by weight of at least one polyol, 0.01 to 5% by weight of water as blowing agent, 0.1 to 50% by weight of at least one polymerizable vinyl monomer, 0.1 to 50% by weight of at least one chelate complex-forming, polymerizable vinyl monomer, 0.01 to 10% by weight of at least one multivalent metal in the form of the chloride or acetylacetonate in the case of chromium, 0.01 to 10% by weight of at least one cell stabilizer and 0 to 10% by weight of at least one catalyst for the reaction of the polyol with the polyisocyanate and the polyisocyanate component (B) contains 1 to 50% by weight of at least one polyisocyanate and 0.01 to 10% by weight of at least one catalyst for the polymerization of the vinyl monomers, based in each case on the total weight of the components (A) and (B), the total amount of these components constituting 100% by weight.

12. The two-component hybrid foam system of claim 1, wherein, as catalyst for the reaction of the polyol with the polyisocyanate, the polyol component (A) contains an aromatic and/or aliphatic, secondary or tertiary amine, an organometallic compound of a metal of the group comprising Zn, Sn, Mn, Mg, Bi, Sb, Pb and Ca.

13. The two-component hybrid foam system of claim 1, wherein the polyisocyanate component (B) contains at least one thermally activatable free radical-forming agent as catalyst for the polymerization of the vinyl monomer.

14. The two-component hybrid foam system of claim 13, wherein, as thermally activatable free radical-forming agent for the polymerization of the vinyl monomers, it contains a peroxide curing agent, chalk, kaolin, silicone oil, aliphatic materials and/or white oil.

15. The two-component hybrid foam system of claim 14, wherein it contains, as peroxide curing agent, at least one representative of the group comprising di-4-t-butylcyclohexyl peroxydicarbonate, dicetyl peroxydicarbonate, dicyclohexyl peroxydicarbonate, dimyristyl peroxydicarbonate, t-butyl peroxyneodecanoate, t-amylperoxy pivalate, dilauroyl peroxide, dibenzoyl peroxide, t-amyl peroxy-2-ethylhexanoate, t-butyl peroxy-2-ethylhexanoate, disuccinoyl peroxide, t-amyl peroxy-2-ethylhexylcarbonate, 1,1-di-(t-butylperoxy)-3,3,5-trimethylcyclohexane, 1,1-di-(t-butylperoxy)cyclohexane, t-butyl peroxyisopropylcarbonate, t-butyl peroxy-3,5,5-trimethylhexanoate, t-butyl peroxy-2-ethylhexylcarbonate, t-butyl peroxyacetate, t-amyl peroxybenzoate, t-butyl peroxybenzoate, 2,2-di-(t-butyl peroxy)-butane, dicumyl peroxide, t-butyl cumylperoxide, di-(t-amyl) peroxide, di-(t-butyl) peroxide, t-butyl hydroperoxide, ammonium peroxodisulfate, sodium peroxodisulfate and potassium peroxodisulfate, or mixtures thereof.

16. The two-component hybrid foam system of claim 1, wherein the polyol component (A) and/or the polyisocyanate component (B) contain at least one intumescing material based on an acid-forming agent, a compound supplying carbon and a gas-forming agent, expanded graphite, an expandable phyllosilicate and/or an additional organic or inorganic flame retardant.

17. The two-component hybrid foam system of claim 16, wherein the polyol component (A) and/or the polyisocyanate component (B) contains a flame retardant selected from the group consisting of red phosphorus, a phosphorus compound, a metal hydroxide, zinc borate and ammonium polyphosphate.

18. The two-component hybrid foam system of claim 1, wherein the polyol component (A) and/or the polyisocyanate component (B) additionally contains at least one inorganic filler.

19. The two-component hybrid foam system of claim 18, wherein the inorganic filler is selected from the group consisting of a metal oxide, a borate, a carbonate, a silicate, kaolin, glass powder, iron oxide, titanium dioxide, silica, an inorganic foam, perlite, vermiculite, a hollow silica and glass spheres.

20. The two-component hybrid foam system of claim 1, wherein the polyol component (A) and/or the polyisocyanate component (B) additionally contains known adjuvants and additives, stabilizers, plasticizers, catalysts, thixotropic agents, diluents or solvents and/or dyes and pigments in conventional amounts.

21. The two-component hybrid foam system of claim 20, wherein hydrophobic or hydrophobized silica is contained as thixotropic agent.

22. The two-component hybrid foam system of claim 20, wherein an aliphatic alcohol is contained as diluent or solvent.

23. The two-component hybrid foam system of claim 1, wherein the polyol component (A) and the polyisocyanate component (B) are contained separated from one another to inhibit reaction in a two-chamber or multichamber device and, under use conditions, are caused to react 24. The two-component polyurethane/vinyl ester hybrid foam system of claim 1, wherein it contains the polymerizable vinyl monomer, forming a chelate complex with the multivalent metal, in an amount of 0.5 to 40% by weight, based on the total weight of the components (A) and (B), and the multivalent metal in an equimolar amount for forming a chelate complex.

25. The two-component polyurethane/vinyl ester hybrid foam system of claim 1, wherein the polyol component (A) contains 10 to 50% by weight of at least one polyol, 0.1 to 4% by weight of water as blowing agent, 0.5 to 40% by weight of at least one polymerizable vinyl monomer, 0.5 to 40% by weight of at least one chelate complex-forming, polymerizable vinyl monomer, 0.1 to 5.0% by weight of at least one multivalent metal in the form of the chloride or acetylacetonate in the case of chromium, 0.1 to 5.0% by weight of at least one cell stabilizer and 0.1 to 5% by weight of at least one catalyst for the reaction of the polyol with the polyisocyanate and the polyisocyanate component (B) contains 10 to 40% by weight of at least one polyisocyanate and 0.1 to 5% by weight of at least one catalyst for the polymerization of the vinyl monomers, based in each ease on the total weight of the components (A) and (B), the total amount of these components constituting 100% by weight.

26. The two-component polyurethane/vinyl ester hybrid foam system of claim 12, wherein the organometallic compound is an octoate, a naphthenate or an acetylacetonate.

27. The two-component polyurethane/vinyl ester hybrid foam system of claim 14, wherein the peroxide curing agent is made inert with phthalate.

28. The two-component polyurethane/vinyl ester hybrid foam system of claim 17, wherein the flame retardant is a halogenated phosphate ester selected from the group consisting of trichloroethyl phosphate, tris(2-chloroisopropyl) phosphate, triphenyl phosphate and tris(2-chloroethyl)phosphate.

29. The two-component polyurethane/vinyl ester hybrid foam system of claim 17, wherein the flame retardant is a metal hydroxide selected from the group consisting of aluminum hydroxide and magnesium hydroxide.

30. The two-component polyurethane/vinyl ester hybrid foam system of claim 17, further comprising antimony oxide as a synergist.

31. The two-component polyurethane/vinyl ester hybrid foam system of claim 22, wherein the aliphatic alcohol comprises butanol.

32. The two-component polyurethane/vinyl ester hybrid foam system of claim 18, wherein the inorganic filler is chalk or foamed expanded clay.

* * * * *